Figure 1:
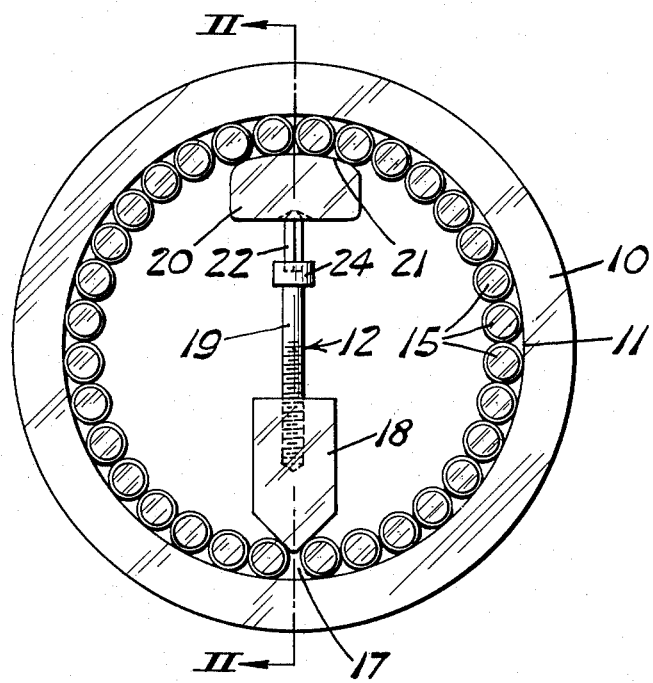

Oct. 11, 1955     H. J. VANSTROM     2,720,065

WORK HOLDING FIXTURE

Filed Oct. 6, 1954

INVENTOR.
HAROLD J. VANSTROM
BY
Beau, Brooks, Buckley & Beau,
ATTORNEYS.

United States Patent Office 2,720,065
Patented Oct. 11, 1955

2,720,065

WORK HOLDING FIXTURE

Harold J. Vanstrom, Bemus Point, N. Y.

Application October 6, 1954, Serial No. 460,655

10 Claims. (Cl. 51—217)

This invention relates to work holding devices and more particularly to a novel fixture for holding a plurality of objects in accurate relative locations for performing abrading or other machining operations thereon or for analogous purposes.

In grinding the radial or end faces of relatively small cylindrical workpieces, particularly in mass production or when a multiplicity of pieces must be similarly ground or otherwise machined, a considerable problem is encountered in properly positioning the workpieces for such grinding or similar machining. The roller elements of roller bearings are a typical case in point, although the work holding fixture of the present invention may be employed for any similar purposes wherever cylindrical or partly cylindrical workpieces are to be held with their end or radial faces or one of their end or radial faces accessible for grinding, other machining, or any similar fabricating or treating operation.

In the instance set forth herein by way of example the cylindrical workpieces, prior to the end face grinding contemplated in the method of the present invention and involving the employment of the fixture of the present invention, have their peripheries accurately ground to precision dimensions. However, it is not necessary to successful operation of the fixture of the present invention that the diameters of the workpieces be entirely precise and equal in their diameters or in finally finished form, although the results obtained will depend in general upon the trueness of the peripheries of the workpieces since, in any event, the end faces of the workpieces held in the fixture of the present invention will be presented for grinding or other machining in such manner that they are accurately disposed at right angles to their peripheries.

While the work holding fixture of the present invention is applicable wherever the advantages inherent in the device make its use advisable, reference will be had in the following specification to its use in holding a plurality of cylindrical workpieces in proper alignment on the magnetic chuck work-receiving table of a conventional surface grinder, to present the workpieces in such position that the radial end faces of a considerable number of the workpieces may be simultaneously ground.

While a single complete specific embodiment of the principles of the present invention, both as to construction of the fixture itself and as to its mode of environment of use, is set forth in detail in the following specification and is illustrated in the accompanying drawing, it is to be understood that the invention is not limited to the details shown and that certain variations in the construction of the fixture and its mode of use may be made without departing from the spirit of the invention, the scope of which is limited only as defined in the appended claims.

Figure 2:
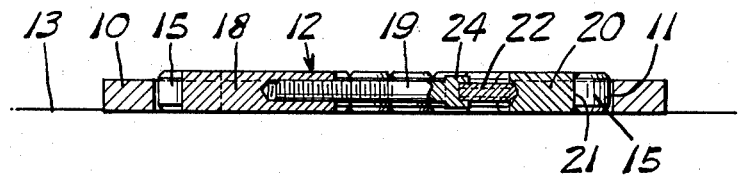

In the drawing:

Fig. 1 is a top plan view of one form of the fixture of the present invention holding a number of cylindrical workpieces in tangentially abutting positions with their axes extending vertically and parallel to each other; and Fig. 2 is a cross-sectional view on the line II—II of Fig. 1.

Referring particularly to Fig. 1, the fixture of the present invention comprises essentially an annular member 10 having a circular central opening 11, the walls of which are preferably precision ground to be precisely at right angles to the axis of the annulus, and a locking member designated generally by the numeral 12, the construction and operation of which will be more specifically described later herein.

In use the annular member 10 is placed upon a surface plate or similar work surface or directly on the magnetic chuck of a surface grinder such as is indicated by the numeral 13 in Fig. 2. A group of cylindrical workpieces in the form of small rollers, the workpieces being designated 15 in the drawing, are placed endwise on the table 13 and arranged generally in tangential abutment with the periphery of the opening 11 of annular member 10, approximately as shown in Fig. 1 of the drawing.

The circumference of the opening 11 of the annular member 10 may be of any desired or convenient extent. When a circular series of workpieces is disposed as shown in Fig. 1 in tangential abutment with the peripheral surface of the opening 11 of annular member 10 and as many workpieces as possible are so arranged, the workpieces will normally not exactly fully occupy such inner periphery but will leave a gap as indicated at 17 in Fig. 1.

Such a gap is not essential to operation of the present invention although it may facilitate placement and securement of the locking member 12. No special predetermination is required and the diameter of opening 11 may be selected at random unless it be desired to accommodate a given number of workpieces.

Locking member 12 comprises a wedge member 18, which may be projected into gap 17 as shown in Fig. 1, and a screw member 19 is threaded thereinto at the end of wedge member 18 which is opposite to its wedge formation. Locking member 12 further comprises a plate member 20 having an arcuate or similarly curved edge portion 21 which is disposable against a series of workpieces 15 as shown in Fig. 1 at a point generally diametrically opposite to the gap 17 or the place in the series of workpieces where the wedge member 18 enters between a pair of workpieces 15.

A pin 22 is rotatably supported between plate member 20 and a head formation 24 of screw member 19. In the illustrated instance, pin 22 is axially rotatably mounted in both the plate member 20 and head 24 of screw member 19 but it is sufficient for purposes of the present invention if pin 22 be rotatable with respect to either of these members in which case it may be fixed to the other.

The head 24 of screw member 19 is square and may be of other non-circular form to receive a wrench or similar tool whereby screw 19 may be threaded into wedge member 18. Such operation obviously elongates the locking member 12 in the direction of the diameter of annular member 10 and forces the wedge formation of wedge member 18 into the gap 17 or between a pair of workpieces 15. This locks the entire series of workpieces 15 securely against the peripheral wall of opening 11 of annular member 10.

The wedging action of the wedge formation of wedge member 18 against the two workpieces which lie at opposite sides of gap 17 exerts substantial force components against these two adjacent workpieces 15 in a circular direction, that is, in a direction lying along a pitch circle drawn through the centers of the various workpieces 15.

When the locking member 12 is thus locked in position the entire assembly comprising annular member 10, the workpieces 15, and the locking member 12 may be picked up and handled as a rigid unit if desired, although the foregoing assembly may be effected directly on the magnetic chuck work receiving table of a machine tool such as a surface grinder. If the assembly is performed on the usual magnetic chuck, it is merely necessary at this point to energize the magnetic chuck and proceed with the grinding of one end face of each of the workpieces simultaneously.

Following the grinding operation or other treatment of the upper ends of the workpieces as viewed in Fig. 2, the workpieces may all be reversed end-for-end to grind their opposite end or radial surfaces. To do this it is not necessary to disassemble the entire group of workpieces, but the entire fixture with the locked workpieces may merely be turned upside down on the work surface, such as the surface of a magnetic chuck 13, and the locking member 12 may be momentarily released by operation of the screw 19 by means of a wrench acting upon its head 24.

Since the annular member 10 and the locking member 12 are preferably of substantially less thickness or vertical dimension than the axial lengths of the workpieces, this temporary unlocking permits the annular member 10 and locking member 12 to drop to the surface of the work table, magnetic chuck table, surface plate, or the like, leaving the ends of the workpieces which are now uppermost disposed substantially above the top surfaces of annular member 10 and locking member 12. The workpieces are then relocked by manipulation of screw member 19 as described above and the second end or radial face of each of the workpieces may be ground or otherwise worked upon as desired.

What is claimed is:

1. A fixture for holding a plurality of cylindrical workpieces with their end faces in substantially common planes comprising an annular member for receiving a generally circular series of such workpieces disposed tangentially against the inner periphery of the annular member with their axes parallel to the axis of the annular member, and a locking member coplanar with and extending substantially diametrally of said annular member, said locking member having a wedge formation at one end in spreading engagement between a pair of workpieces of said series and a curved abutment surface at its other end engaging against the inner peripheral surfaces of a plurality of said workpieces lying generally opposite to said pair of workpieces in said series, said locking member being selectively extensible to lock the series of workpieces by such abutment and wedging action.

2. A fixture for holding a plurality of cylindrical workpieces with their end faces in substantially common planes comprising an annular member for receiving a generally circular series of such workpieces disposed tangentially against the inner periphery of the annular member with their axes parallel to the axis of the annular member, and a locking member coplanar with and extending substantially diametrally of said annular member, said locking member having a wedge formation at one end in spreading engagement between a pair of workpieces of said series and a curved abutment surface at its other end engaging against the inner peripheral surfaces of a plurality of said workpieces lying generally opposite to said pair of workpieces in said series, said locking member having a threaded connection therein including a rotatable part for selectively adjusting the length of said member to lock the series of workpieces by such abutment and wedging action.

3. A fixture for holding a plurality of cylindrical workpieces with their end faces in substantially common planes comprising an annular member for receiving a generally circular series of such workpieces disposed tangentially against the inner periphery of the annular member with their axes parallel to the axis of the annular member, and a locking member coplanar with and extending substantially diametrally of said annular member, said locking member having a wedge formation at one end in spreading engagement between a pair of workpieces of said series and a curved abutment surface at its other end engaging against the inner peripheral surfaces of a plurality of said workpieces lying generally opposite to said pair of workpieces in said series, said locking member having a threaded connection therein including a rotatable part for selectively adjusting the length of said member to lock the series of workpieces by such abutment and wedging action, said rotatable part having a tool-engageable portion to facilitate rotating the same to lock and unlock the workpieces.

4. A fixture for holding a plurality of cylindrical workpieces with their end faces in substantially common planes comprising an annular member for receiving a generally circular series of such workpieces disposed tangentially against the inner periphery of the annular member with their axes parallel to the axis of the annular member, and a locking member coplanar with and extending substantially diametrally of said annular member, said locking member having a wedge member at one end in spreading engagement between a pair of workpieces of said series, an abutment member at its other end engaging against the inner peripheral surfaces of a plurality of said workpieces lying generally opposite to said pair of workpieces in said series, and an intermediate element rotatable with respect to said wedge and abutment members and having threaded engagement with one of them whereby rotation of said intermediate element extends the locking member to lock the series of workpieces by such abutment and wedging action.

5. A fixture for holding a plurality of cylindrical workpieces with their end faces in substantially common planes comprising an annular member for receiving a generally circular series of such workpieces disposed tangentially against the inner periphery of the annular member with their axes parallel to the axis of the annular member, and a locking member coplanar with and extending substantially diametrally of said annular member, said locking member having a wedge formation at one end in spreading engagement between a pair of workpieces of said series and an abutment surface at its other end engaging against a workpiece lying generally opposite to said pair of workpieces in said series, said locking member being selectively extensible to lock the series of workpieces by such abutment and wedging action.

6. A fixture for holding a plurality of cylindrical workpieces comprising a member having a circular opening for receiving a generally circular series of such workpieces disposed tangentially against the periphery of said opening with their axes parallel to the axis of the opening, and a locking member coplanar with and extending substantially diametrally of said circular opening, said locking member having a wedge formation at one end in spreading engagement between a pair of workpieces of said series and a curved abutment surface at its other end engaging against the inner peripheral surfaces of a plurality of said workpieces lying generally opposite to said pair of workpieces in said series, said locking member being selectively extensible to lock the series of workpieces by such abutment and wedging action.

7. A fixture for holding a plurality of cylindrical workpieces comprising a member having a circular opening for receiving a generally circular series of such workpieces disposed tangentially against the periphery of said opening with their axes parallel to the axis of the opening, and a locking member coplanar with and extending substantially diametrally of said circular opening, said locking member having a wedge formation at one end in spreading engagement between a pair of workpieces of said series and a curved abutment surface at its other end engaging against the inner peripheral surfaces of a plurality of said workpieces lying generally opposite to said pair of workpieces in said series, said locking member having a threaded connection therein including a rotatable part for selectively adjusting the length of said member to lock the series of workpieces by such abutment and wedging action.

8. A fixture for holding a plurality of cylindrical workpieces comprising a member having a circular opening for receiving a generally circular series of such workpieces disposed tangentially against the periphery of said opening with their axes parallel to the axis of the opening, and a locking member coplanar with and extending substantially diametrally of said annular member, said locking member having a wedge formation at one end in spreading engagement between a pair of workpieces of said series and a curved abutment surface at its other end engaging against the inner peripheral surfaces of a plurality of said workpieces lying generally opposite to said pair of workpieces in said series, said locking member having a threaded connection therein including a rotatable part for selectively adjusting the length of said member to lock the series of workpieces by such abutment and wedging action, said rotatable part having a tool-engagable portion to facilitate rotating the same to lock and unlock the workpieces.

9. A fixture for holding a plurality of cylindrical workpieces comprising a member having a circular opening for receiving a generally circular series of such workpieces disposed tangentially against the periphery of said opening with their axes parallel to the axis of the opening, and a locking member coplanar with and extending substantially diametrally of said circular opening, said locking member having a wedge member at one end in spreading engagement between a pair of workpieces of said series and an abutment member at its other end engaging against the inner peripheral surfaces of a plurality of workpieces lying generally opposite to said pair of workpieces in said series, and an intermediate element rotatable with respect to said wedge and abutment members and having threaded engagement with one of them whereby rotation of said intermediate element extends the locking member to lock the series of workpieces by such abutment and wedging action.

10. A fixture for holding a plurality of cylindrical workpieces comprising a member having a circular opening for receiving a generally circular series of such workpieces disposed tangentially against the periphery of said opening with their axes parallel to the axis of the opening, and a locking member coplanar with and extending substantially diametrally of said circular opening, said locking member having a wedge formation at one end in spreading engagement between a pair of workpieces of said series and an abutment surface at its other end engaging against a workpiece lying generally opposite to said pair of workpieces in said series, said locking member being selectively extensible to lock the series of workpieces by such abutment and wedging action.

References Cited in the file of this patent

UNITED STATES PATENTS

| | | |
|---|---|---|
| 479,406 | Dickerson et al. | July 26, 1892 |
| 1,763,647 | Danner | June 17, 1930 |
| 2,287,097 | Graham | June 23, 1942 |
| 2,695,481 | Vanstrom | Nov. 30, 1954 |